Figure 1:
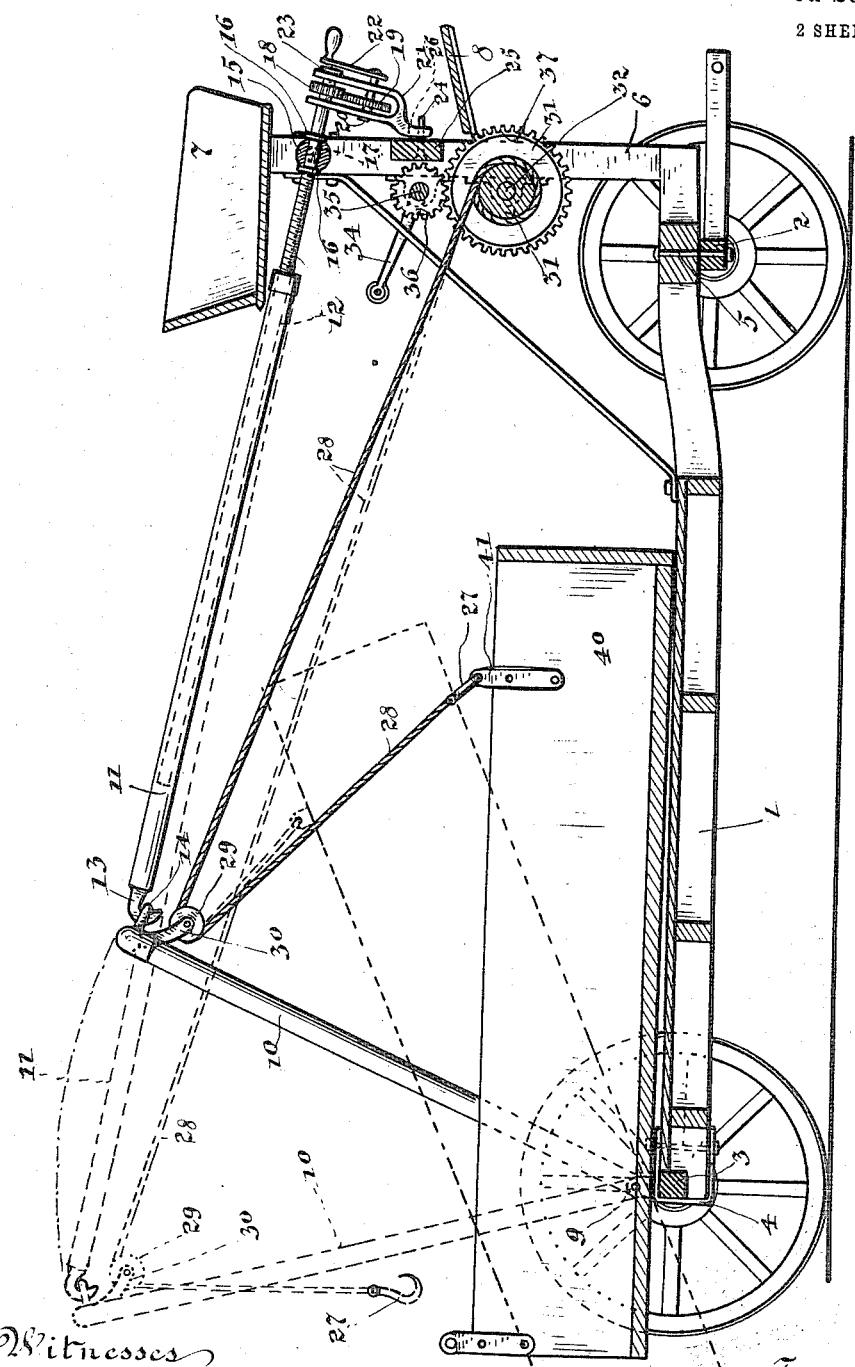

C. A. WILLIAMS.
TRUCK.
APPLICATION FILED JULY 20, 1910.

1,038,809.

Patented Sept. 17, 1912.
2 SHEETS—SHEET 1.

Witnesses
W. C. Smith
H. J. Hansen

Inventor
Clarence A. Williams,
by Joshua R. H. Potts
his Attorney.

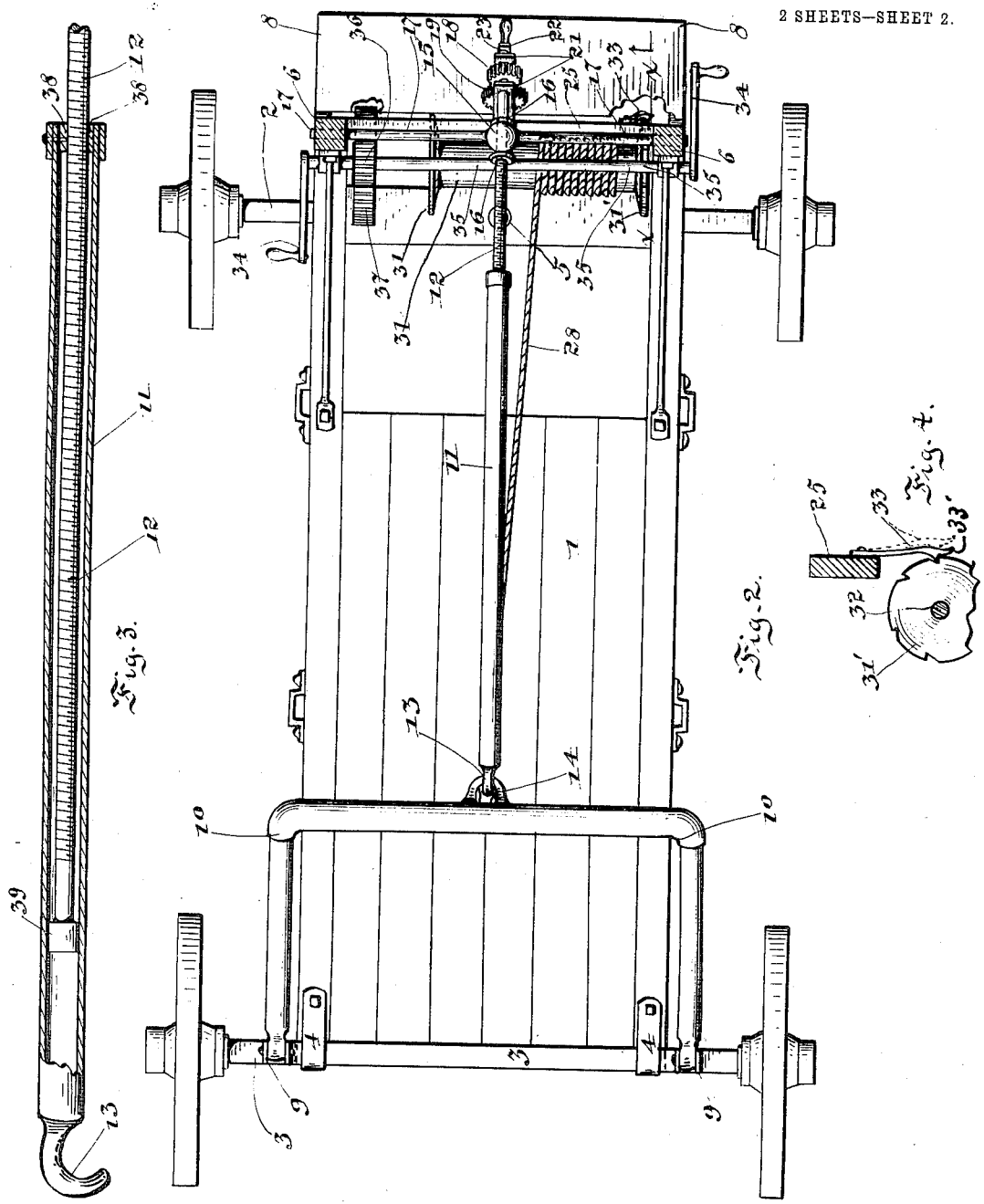

UNITED STATES PATENT OFFICE.

CLARENCE A. WILLIAMS, OF CHICAGO, ILLINOIS.

TRUCK.

1,038,809.

Specification of Letters Patent.   Patented Sept. 17, 1912.

Application filed July 20, 1910.   Serial No. 572,887.

*To all whom it may concern:*

Be it known that I, CLARENCE A. WILLIAMS, a citizen of the United States, residing at Chicago, county of Cook, and State of Illinois, have invented certain new and useful Improvements in Trucks, of which the following is a specification.

My invention relates to improvements in trucks and more particularly to that class of trucks in which appliances are provided for elevating and depositing heavy objects thereon and for unloading the same, the object of the invention being the provision of a truck of this character by means of which safes, heavy pieces of furniture, and building material may be handled and transported with ease and expedition.

A further object of my invention is to provide a truck which shall be simple of design, economical to manufacture, and efficient in operation.

Other objects will appear hereinafter.

With these objects in view my invention consists in the novel construction and arrangement of parts as will be hereinafter fully described and more particularly pointed out in the appended claim.

My invention will be more readily understood by reference to the accompanying drawings forming a part of this specification, and in which, Figure 1 is a longitudinal section of my improved truck in its preferred form, Fig. 2 is a top plan view showing the truck with the driver's seat thereof and a portable box removed therefrom, Fig. 3 is a detail longitudinal section, and Fig. 4 is a detail view taken on line *x—x* of Fig. 2.

The preferred form of my invention as illustrated in the accompanying drawings comprises a main frame or body 1 mounted upon front and rear axles 2 and 3 respectively, the rear end of said body being secured to the rear axle by means of U-shaped clips 4 and the front end thereof being pivoted to the front axle by means of a king-pin 5. At the front end of the body 1 vertical standards 6 are provided which support the driver's seat 7 and a foot board 8.
Pivoted to the rear axle by means of couplings 9 is a U-shaped tubular frame 10 which is adapted to oscillate longitudinally over said axle, as indicated by dotted lines. In order to control the oscillation of the frame 10 a tubular longitudinally extending member 11 is provided and a threaded rod 12 which is adapted to screw into said member, said rod being rotatable and connected to the standards 6 of the frame 1.
The rear end of the tubular member 11 is provided with a hook 13 engaging an eye 14 which is centrally positioned on the frame 10. The rod 12 is journaled in a member 15 and held against longitudinal movement therein by means of collars 16, said member being an enlargement of a transversely extending shaft 17 which is journaled in the standards 6. Mounted on the front end of the rod 12 is a spur pinion 18, and meshing therewith is a driving gear 19 which is secured to the shaft 20. The shaft 20 is journaled in a frame 21 and carries a crank 22 by means of which the device is manually operated. The frame 21 is mounted upon the rod 12 and is retained thereon by means of a flange 23 provided at the end of said rod. In order to prevent the frame 21 from revolving on the rod 12 a pin 24 is provided which projects forwardly from the transversely extending beam 25 which connects the standards 6, the rear end of said frame being bifurcated, as indicated by dotted lines 26, thus providing a loose connection with said pin.

The elevating apparatus comprises a hook 27 attached to a cord 28 which passes over a pulley 29, the latter being mounted in a hanger 30 depending from the frame 10. The cord 28 constitutes a part of the windlass 31 which is provided with a ratchet wheel 31' at one end thereof. The windlass shaft 32 is transversely mounted on the standards 6 and is prevented from rotation in one direction by means of the pawl 33 which automatically engages the ratchet wheel 31', said pawl being provided with a projection 33' at its lower extremity by means of which it may be manually disengaged from said ratchet wheel for releasing the same. The windlass is manually operated by means of cranks 34 which are secured at either end of a transversely extending driving shaft 35 which carries a driving pinion 36. The driving pinion 36 meshes with and is adapted to drive the gear 37 mounted thereunder at one end of the windlass reel. The tubular member 11 is provided with a threaded nut 38 at its forward end into which the rod 12 is adapted to screw, an enlargement 39 being provided at the rear end of said rod which serves as a guide therefor.

The operation of the truck is as follows: When the portable box 40 is used and it is desired to dump material contained therein, the hook 27 is engaged with an eyelet 41 provided on said box. By operating the cranks 34 the box 40 is readily moved to the dotted line position when the contents thereof will be dumped therefrom. When it is desired to load an object onto the truck the crank 22 is rotated in such a direction as to cause the frame 10 to assume the dotted line position, when the hook 27 is lowered by means of the windlass and attached to the object to be elevated. When the object is raised by means of the windlass the crank 22 is rotated so that the frame 10 will assume its former position which causes the object to be carried vertically over the body. The object is then deposited on the body by releasing the pawl 33.

By means of a truck of the construction set forth heavy objects may be handled and transported with ease and expedition, the usual difficulties experienced in handling such objects being entirely overcome.

While I have shown what I deem to be the preferable form of my improved truck, I do not wish to be limited thereto as there might be various changes made in the details of construction and arrangement of parts described without departing from the spirit of the invention, and hence I desire to avail myself of such changes and alterations as fairly fall within the scope of the appended claim.

Having described my invention what I claim as new and desire to secure by Letters Patent is:

A truck of the class described, comprising front and rear wheeled axles, a body mounted thereon, a U-shaped frame pivoted to the rear axle and adapted to oscillate longitudinally thereover, a pulley depending from said frame, a longitudinal tubular member pivotally engaged at its rear end with said U-shaped frame, a tubular nut in the forward end of said member, a threaded rod screwed into said tubular member, a guide on the inner end of said rod, a transversely extending shaft journaled in the front of the truck in which said rod is pivotally mounted but held against longitudinal movement, spur and driving gears for said rod at its outer front end, a frame carrying said spur and driving gears, a pin on said truck loosely engaging a slot in said frame for preventing rotary motion thereof, and a windlass mounted on said body in operative connection with said pulley.

In testimony whereof I have signed my name to this specification in the presence of two subscribing witnesses.

CLARENCE A. WILLIAMS.

Witnesses:
JANET E. HOGAN,
JOSHUA R. H. POTTS.